United States Patent
Song et al.

(10) Patent No.: US 12,298,116 B2
(45) Date of Patent: May 13, 2025

(54) METHOD FOR PLUGGING/UNPLUGGING PROBE OF METALLURGICAL AUTOMATIC SUBLANCE

(71) Applicant: BAOSHAN IRON & STEEL CO., LTD., Shanghai (CN)

(72) Inventors: Xitao Song, Shanghai (CN); Ruimin Wu, Shanghai (CN); Zhenhong Wei, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 255 days.

(21) Appl. No.: 17/922,681

(22) PCT Filed: May 14, 2021

(86) PCT No.: PCT/CN2021/093839
§ 371 (c)(1),
(2) Date: Nov. 1, 2022

(87) PCT Pub. No.: WO2021/233226
PCT Pub. Date: Nov. 25, 2021

(65) Prior Publication Data
US 2023/0204341 A1      Jun. 29, 2023

(30) Foreign Application Priority Data

May 19, 2020   (CN) .......................... 202010424250.3

(51) Int. Cl.
*G01B 11/00* (2006.01)
*B25J 9/16* (2006.01)
(Continued)

(52) U.S. Cl.
CPC ........... *G01B 11/002* (2013.01); *B25J 9/1687* (2013.01); *B25J 9/1692* (2013.01); *F27D 21/00* (2013.01);
(Continued)

(58) Field of Classification Search
CPC ... G01B 11/002; G01B 11/005; G01B 11/026; G01B 11/0608; G01B 11/14;
(Continued)

(56) References Cited

U.S. PATENT DOCUMENTS

| | | | |
|---|---|---|---|
| 11,813,707 B2 * | 11/2023 | Wei ......................... | B23P 19/10 |
| 2017/0312913 A1 | 11/2017 | Cousins | |
| 2023/0221109 A1 * | 7/2023 | Song .................... | G01B 11/026 |
| | | | 356/614 |

FOREIGN PATENT DOCUMENTS

| | | | |
|---|---|---|---|
| CN | 102794775 A | * | 11/2012 |
| CN | 203559073 U | * | 4/2014 |

(Continued)

OTHER PUBLICATIONS

The extended European search report for App. No. 21808158.6, dated Oct. 5, 2023.
(Continued)

*Primary Examiner* — Gordon J Stock, Jr.
(74) *Attorney, Agent, or Firm* — Lei Fang, Esq.; Smith Tempel Blaha LLC

(57) ABSTRACT

Disclosed in the present invention is a method for plugging/unplugging a probe of a metallurgical automatic sublance. A laser distance sensor is mounted on an end-effector of a drive device; the drive device drives the laser distance sensor to scan the automatic sublance according to setting areas; position and orientation information of the automatic sublance is calculated by a calculation unit; according to the position and orientation information of the automatic sublance, a gripper on the end-effector implements a process of plugging/unplugging the probe of the automatic sublance. According to the present invention, an existing automatic sublance does not need to be improved, and only external sensors need to be used for plugging/unplugging detection, (Continued)

so that the plugging/unplugging process can be accurately carried out.

14 Claims, 6 Drawing Sheets

(51) Int. Cl.
  *F27D 21/00* (2006.01)
  *G01B 11/14* (2006.01)
  *G01B 11/26* (2006.01)
  *G01S 17/06* (2006.01)
(52) U.S. Cl.
  CPC .............. *G01B 11/14* (2013.01); *G01B 11/26* (2013.01); *G01S 17/06* (2013.01); *G05B 2219/39024* (2013.01); *G05B 2219/40032* (2013.01)
(58) Field of Classification Search
  CPC ....... G01B 11/24; G01B 11/27; G01B 11/272; G01B 11/22; G01B 11/26; B25J 9/1692; B25J 9/1687; B25J 9/1664; B25J 9/10; B25J 13/089; B25J 13/088; B25J 13/02; G05B 2219/39024; G05B 2219/37008; G05B 2219/37053; G05B 2219/39021; G05B 2219/39026; G05B 2219/40032; G05B 2219/40557; G01S 17/06; G01S 17/08; G01S 17/42; G01S 17/66; G01S 17/88; B25B 27/14; G06T 2207/30164; F27D 19/00; F27D 2019/0003; F27D 2019/0006; F27D 2019/0018; F27D 2019/0025; F27D 2019/0028; F27D 2019/0071; F27D 21/00; F27D 21/0014; F27D 21/0021; F27D 21/0028; F27D 21/02; G01C 3/00; G01C 3/02; G01C 3/06; G01C 3/08; G01C 1/00; G01C 5/00; G01C 9/00; G01C 9/02; G01C 9/06

See application file for complete search history.

(56) References Cited

FOREIGN PATENT DOCUMENTS

| | | |
|---|---|---|
| CN | 104690551 A | 6/2015 |
| CN | 106226736 A | 12/2016 |
| CN | 109570948 A | 4/2019 |
| CN | 109866241 A | 6/2019 |
| CN | 109870245 A | 6/2019 |
| CN | 109990705 A | 7/2019 |
| CN | 110893534 A | 3/2020 |
| CN | 110961583 A | 4/2020 |
| WO | 2020-52624 A1 | 3/2020 |

OTHER PUBLICATIONS

Luo et al., "Multi-sensor based object grasping with eye-in hand laser ranger", IECON 2009—35th Annual Conference of IEEE Industrial Electronics (IECON 2009)—Nov. 3-5, 2009—Porto, Portugal, IEEE, Piscataway, NJ, USA, Nov. 13, 2009, pp. 2289-2294, XPO31629945, ISEN: 978-1-4244-4648-3, II.A.
International Search Report for PCT/CN2021/093839 dated Jul. 27, 2021.
International Written Opinion for PCT/CN2021/093839 dated Jul. 27, 2021.
CN First OA for CN202010424250.3.

* cited by examiner

METHOD FOR PLUGGING/UNPLUGGING PROBE OF METALLURGICAL AUTOMATIC SUBLANCE

CROSS-REFERENCE TO RELATED APPLICATIONS

This application is a 371 U.S. National Phase of PCT International Application No. PCT/CN2021/093839 filed on May 14, 2021, which claims priority to a Chinese Application No. 202010424250.3 filed on May 19, 2020, the contents of both are incorporated by reference herein in their entireties.

TECHNICAL FIELD

The present invention relates to the technical field of automatic sublances in the metallurgical industry, and more particularly, to a method for plugging/unplugging a probe of a metallurgical automatic sublance.

BACKGROUND

There is a large number of automatic sublances in a metallurgical area, but the plugging and unplugging process of probes adapted thereto are still mainly done manually. A working environment in the metallurgical area is harsh with high temperature and a large amount of dust, and there is a greater intensity of labor and risk in manual operation.

SUMMARY

Regarding to above defects existing in the prior art, an object of the present invention is to provide a method for plugging/unplugging a probe of a metallurgical automatic sublance, which does not need to improve the prior automatic sublance, and only needs to use external sensors to carry out plugging/unplugging detection, so that the plugging/unplugging process can be accurately carried out.

In order to achieve the above object, the present invention adopts following technical solutions:

A method for plugging/unplugging a probe of a metallurgical automatic sublance, including: mounting a laser distance sensor on an end-effector of a drive device, driving the laser distance sensor by the drive device to scan the automatic sublance according to setting areas; calculating and obtaining a position and orientation information of the automatic sublance by a calculation unit; and according to the position and orientation information of the automatic sublance, implementing a process of plugging/unplugging the probe on/from the automatic sublance by a gripper on the end-effector.

Further, the method further includes a probe plugging detection process and a probe unplugging detection process.

Further, the probe plugging detection process includes following steps of:

1) providing a plugging setting area on a periphery of the automatic sublance, wherein a bottom of the plugging setting area is a plugging detection set height III, a top of the plugging setting area is a plugging detection set height II, and a plugging detection set height I is provided above the plugging detection set height II, and an end of the automatic sublance is located within the plugging setting area;

2) driving, by the drive device, the end-effector such that the laser distance sensor moves and scans the automatic sublance along a+Y direction of a world coordinate system O-XYZ at the plugging detection set height I and the plugging detection set height II to obtain central points of the automatic sublance at the plugging detection set height I and the plugging detection set height II respectively, and calculating and obtaining, by the calculation unit, a position and orientation information of an axis of the automatic sublance composed of the two central points;

3) driving, by the drive device, the end-effector such that the laser distance sensor moves and scans towards the plugging detection set height III according to the position and orientation information of the axis of the automatic sublance obtained in the step 2), so as to obtain a position and orientation information of a center point at an end of the axis of the automatic sublance; and 4) according to the position and orientation information of the center point at the end of the axis of the automatic sublance, driving, by the drive device, the end-effector such that the gripper grasps the probe and plugs the probe to the end of the automatic sublance within the plugging setting area.

Further, the probe unplugging detection process includes following steps of:

a) providing an unplugging setting area on the periphery of the automatic sublance, wherein a top of the unplugging setting area is an unplugging detection set height I, an unplugging detection set height II is provided above the unplugging detection set height I, and an unplugging detection set height III is provided above the unplugging detection set height II, and the probe of the automatic sublance is located within the unplugging setting area;

b) driving, by the drive device, the end-effector such that the laser distance sensor moves and scans the automatic sublance along the +Y direction of the world coordinate system O-XYZ at the unplugging detection set height I and the unplugging detection set height II to obtain central points of the automatic sublance at the unplugging detection set height I and the unplugging detection set height II respectively, and calculating and obtaining, by the calculation unit, a position and orientation information of an axis of the probe composed of the two central points;

c) driving, by the drive device, the end-effector such that the laser distance sensor moves and scans towards the unplugging detection set height III according to the position and orientation information of the axis of the probe obtained in the step 2), so as to obtain a position information of an upper end surface of the probe; and d) according to the position and orientation information of the axis of the probe and the position information of the upper end surface, driving, by the drive device, the end-effector such that the gripper grasps the probe and unplugs the probe from the automatic sublance within the plugging setting area.

Further, the plugging setting area and the unplugging setting area are each provided as a cuboid with three sides of each of the plugging setting area and the unplugging setting area being parallel to three coordinate axes of the world coordinate system O-XYZ.

Further, a position of the plugging detection set height III is lower than a position of the end of the automatic sublance.

Further, in the step 4), the gripper grasping the probe performs plugging according to the position and orientation of the end of the automatic sublance and the position and orientation of the axis of the automatic sublance under the drive of the drive device to realize plugging of the probe.

Further, in the step 4), after the gripper for grasping the probe plugs the probe on a short section of the end of the automatic sublance under the drive of the drive device, the automatic sublance is pulled back to a plugging position where the axis is parallel to a Z axis of the world coordinate system O-XYZ, and then the plugging of the probe is performed.

Further, a position of the unplugging detection set height III is higher than a position of an upper end surface of the probe on the automatic sublance.

Further, in the step d), the gripper grasping the probe performs unplugging according to the position and orientation of the axis of the probe under the drive of the drive device to realize the unplugging of the probe.

Further, in the step d), the gripper for grasping the probe pulls the probe back to an unplugging position where the axis is parallel to a Z axis of the world coordinate system O-XYZ under the drive of the drive device and then performs the unplugging of the probe.

Further, the drive device is a 6-DOF (six-degree-of-freedom) industrial robot. Further, an opening degree of the gripper is larger than an outer diameter of the probe on the automatic sublance.

In the above technical solution, the method for plugging/unplugging the probe of the metallurgical automatic sublance provided by the invention is mainly characterized in that when the solution is implemented in the metallurgical area, the existing automatic sublance does not need to be additionally improved, and at the same time, the method can increase the stability of the probe automatic plugging/unplugging process.

DETAILED DESCRIPTION

The technical solution of the present invention is further explained below with reference to the drawings and embodiments.

Figure 1:
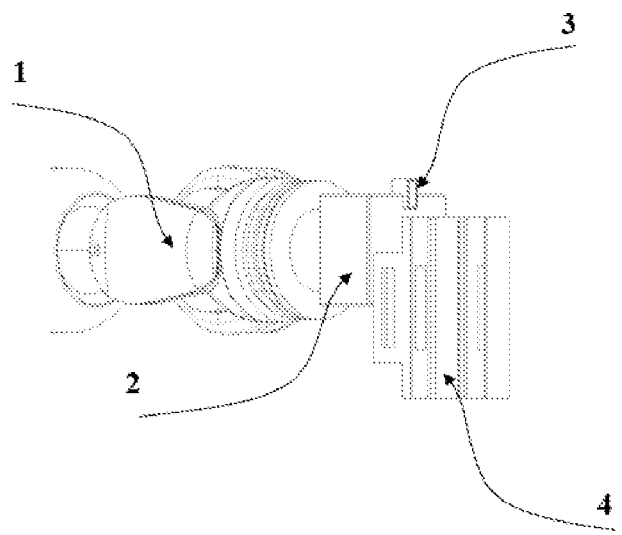
FIG. 1 is an axial-side schematic view of an embodiment of a device of the present invention.
Figure 2:
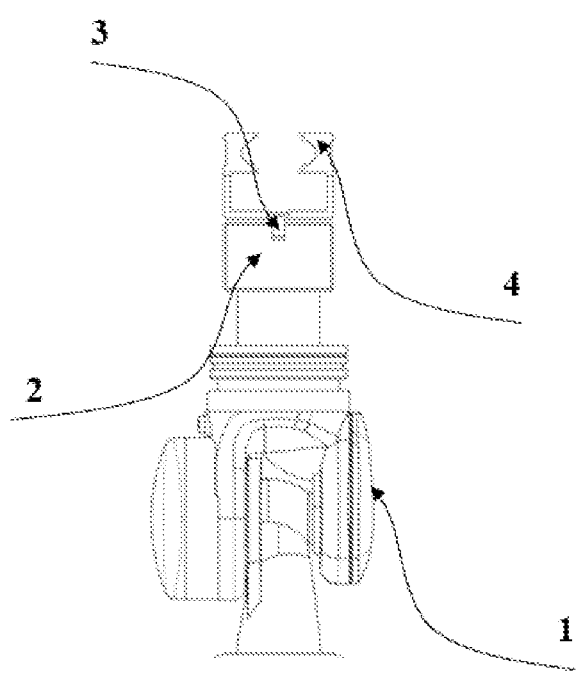
FIG. 2 is a schematic top view of the embodiment of the device of the present invention.
Figure 3:
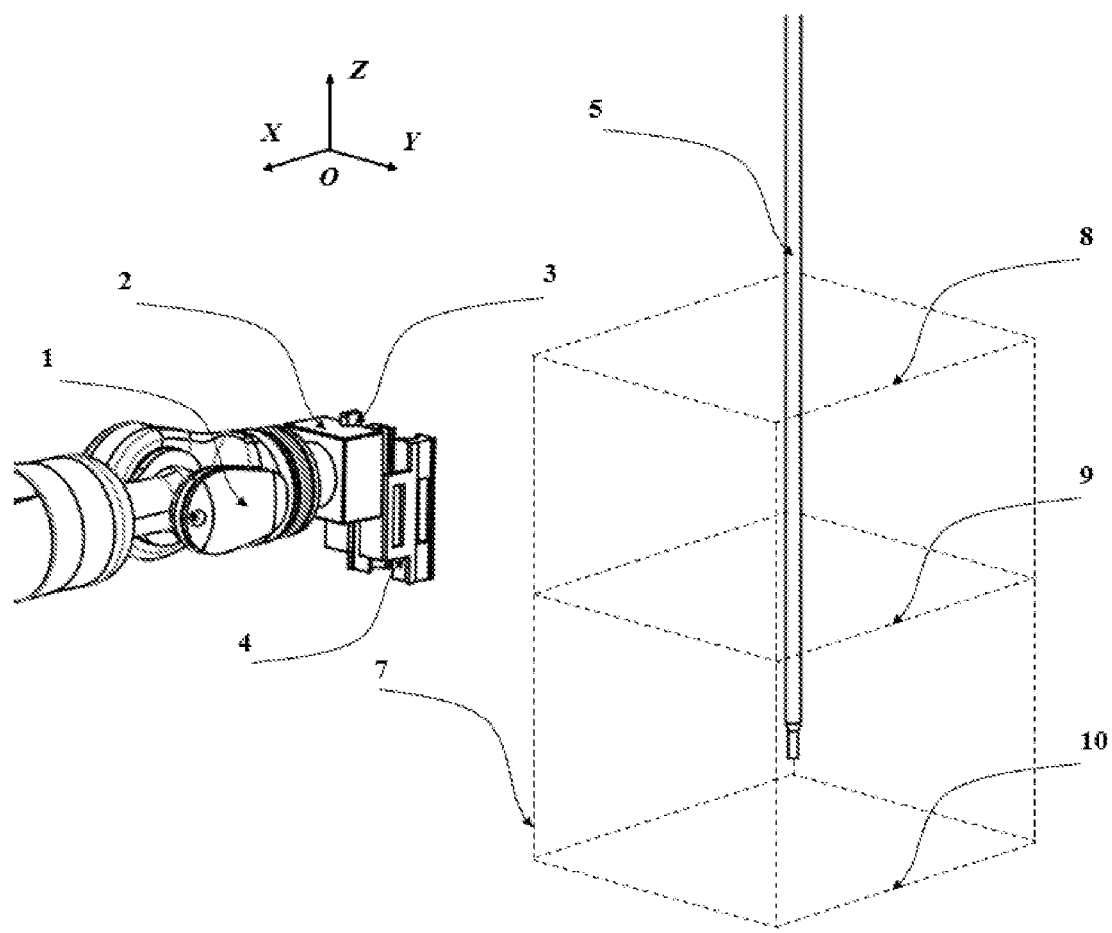
FIG. 3 is an axial-side schematic view of a probe plugging detection of an embodiment of a method of the present invention.
Figure 4:
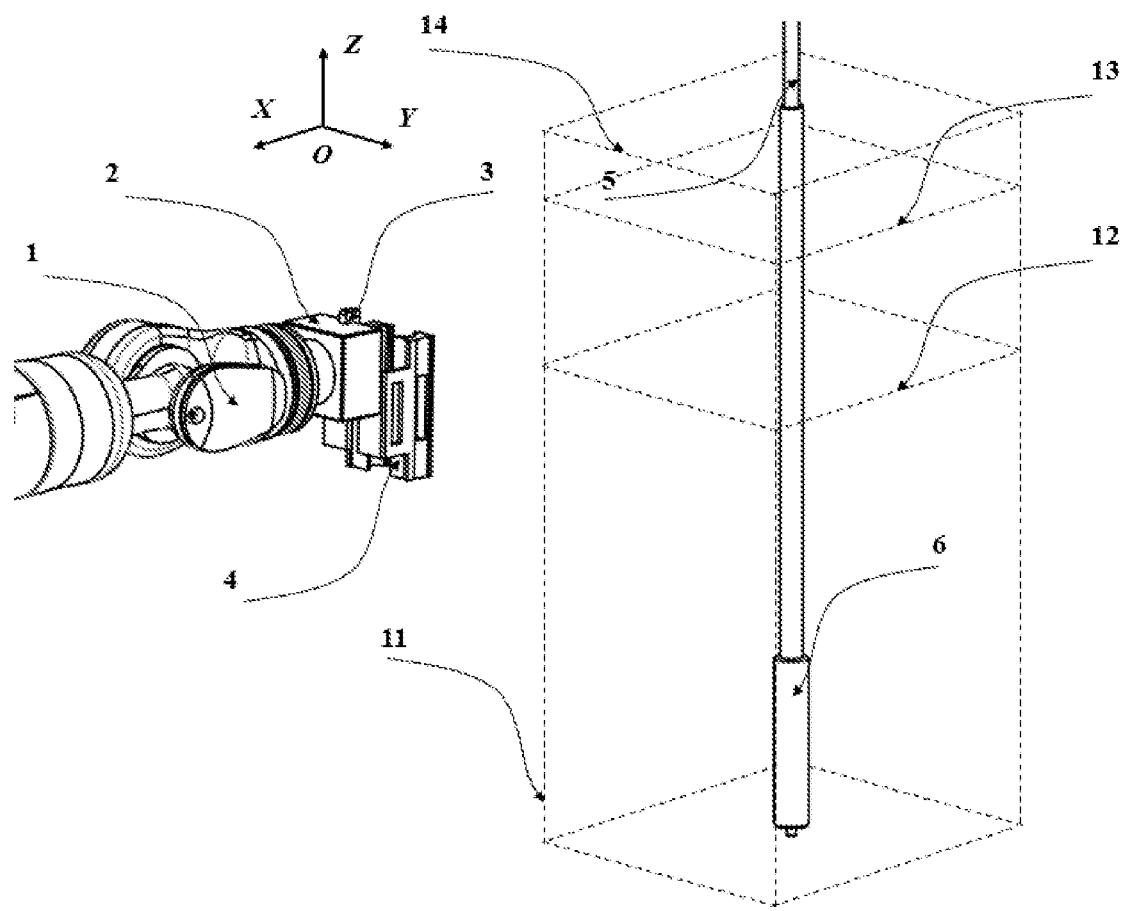
FIG. 4 is an axial-side schematic view of a probe unplugging detection of the embodiment of the method of the present invention.
Figure 5:
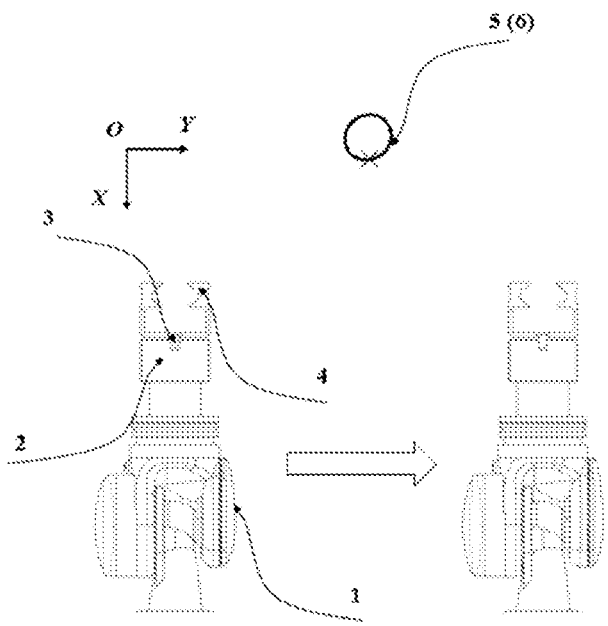
FIG. 5 is a schematic top view, in which a cross section of an automatic sublance is swept by a laser distance sensor, of the embodiment of the method of the present invention.
Figure 6:
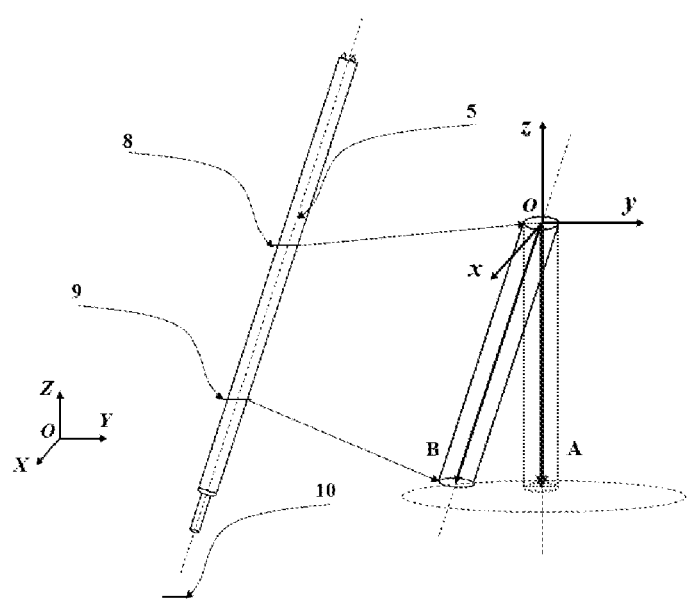
FIG. 6 is a schematic view of step 2) in the probe plugging detection of the embodiment of the method of the present invention.
Figure 7:
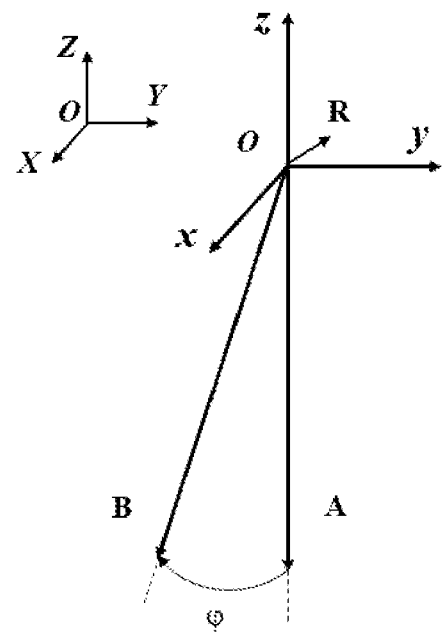
FIG. 7 is a schematic view of a rotation angle φ in FIG. 6.
Figure 8:
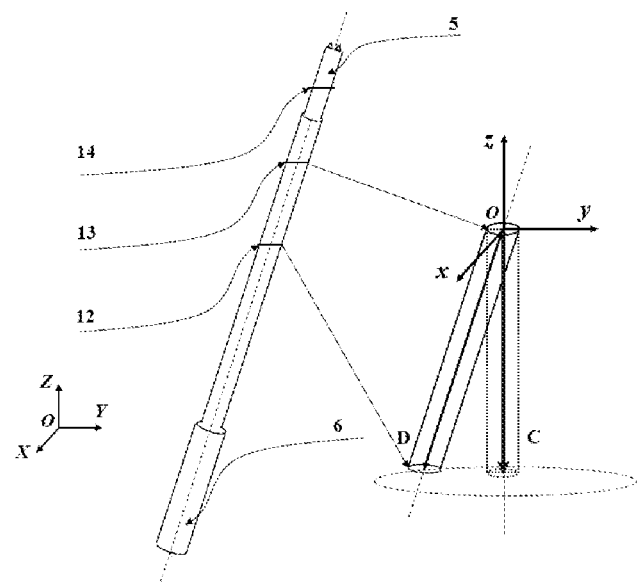
FIG. 8 is a schematic view of step b) in the probe unplugging detection of the embodiment of the method of the present invention.
Figure 9:
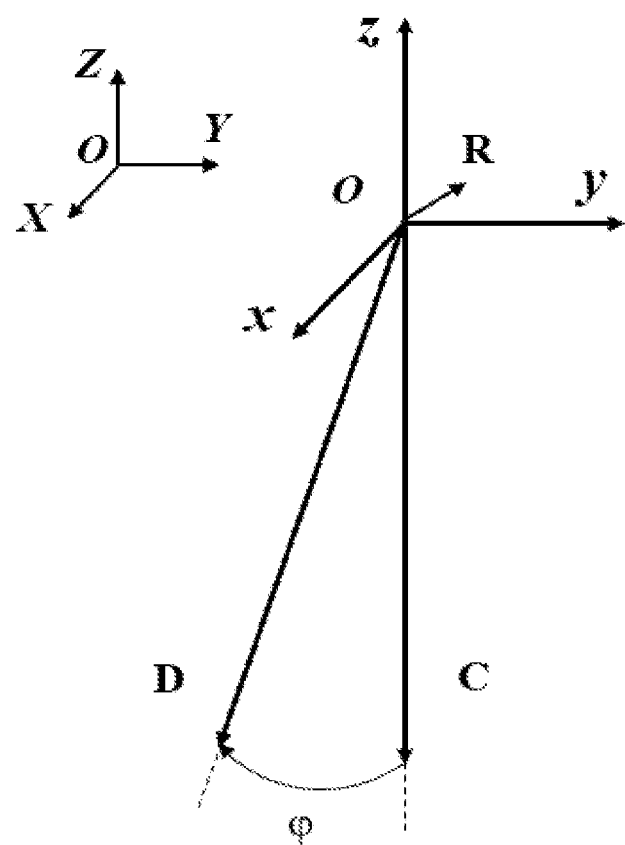
FIG. 9 is a schematic view of a rotation angle φ in FIG. 8.

A method for plugging/unplugging a probe of a metallurgical automatic sublance provided by the present invention uses a drive device 1 and a calculation unit, as shown in FIG. 1 and FIG. 2.

The drive device 1 is installed with a gripper 4 and a laser distance sensor 3 by means of an end-effector 2, a laser emitting surface of the laser distance sensor 3 being directed towards an automatic sublance 5.

The laser distance sensor 3 is mounted on the end-effector 2, in a preferred implementation, the laser distance sensor 3 is mounted on the gripper 4, and the laser emitting surface of the laser distance sensor 3 is perpendicular (orthogonal) to a feed direction of the drive device 1.

The gripper 4 is mounted on the end-effector 2, in a preferred implementation, the gripper 4 can grasp the cylindrical automatic sublance 5, with a length in an axial direction of the grasped automatic sublance 5 and an opening degree which is greater than an outer diameter of a probe 6 on the automatic sublance 5 and will not damage the probe 6 when the grasping is stable after the opening is closed.

The drive device 1 requires at least six degrees of freedom locally, in a preferred implementation, the drive device 1 selects a 6-DOF industrial robot.

The laser distance sensor 3 transmits acquired position and orientation information of the automatic sublance 5 to a calculation unit which outputs a calculation result and drives the drive device 1 so that the gripper 4 grasps the probe 6 on the automatic sublance 5.

Referring now to FIGS. 3-9, the method of the present invention includes a probe plugging detection process and a probe unplugging detection process.

The probe plugging detection process includes following steps of:

1) providing a plugging setting area 7 on a periphery of the automatic sublance 5, wherein a bottom surface of the plugging setting area 7 is set as a plugging detection set height III 10, a top surface of the plugging setting area 7 is set as a plugging detection set height II 9, and a plugging detection set height I 8 is provided above the plugging detection set height II 9, and an end of the automatic sublance 5 is located within the plugging setting area 7;

2) driving, by the drive device 1, the end-effector 2 such that the laser distance sensor 3 moves and scans the automatic sublance 5 along a+Y direction of a world coordinate system O-XYZ at the plugging detection set height I 8, wherein during the scanning, a position value of the end-effector 2 in the world coordinate system O-XYZ when a measured value of the laser distance sensor 3 is the minimum is recorded, at the same time, a center point I ($X_I$, $Y_I$, $Z_I$) of the cross section of the automatic sublance 5 at the plugging detection set height I 8 can be calculated with reference to an indicated value of the laser distance sensor 3 and a diameter value of the automatic sublance 5 at the height where the scanning occurs; driving the end-effector 2 by the driving device 1 such that the laser distance sensor 3 moves and scans the automatic sublance 5 along the +Y direction of the world coordinate system O-XYZ at the plugging detection set height II 9, wherein during the scanning, a position value of the end-effector 2 in the world coordinate system O-XYZ when a measured value of the laser distance sensor 3 is the minimum is recorded, at the same time, a center point II ($X_{II}$, $Y_{II}$, $Z_{II}$) of the cross section of the automatic sublance 5 at the plugging detection set height II 9 can be calculated with reference to an indicated value of the laser distance sensor 3 and a diameter value of the automatic sublance 5 at the height where the scanning occurs. A vector from ($X_{II}$, $Y_{II}$, $Z_{II}$) to ($X_I$, $Y_I$, $Z_I$) is denoted as a vector B=($X_{II}-X_I$, $Y_{II}-Y_I$, $Z_{II}-Z_I$), and is briefly denoted as the vector B=($b_1$, $b_2$, $b_3$). Then, a vector A=($a_1$, $a_2$, $a_3$) of the vector B can be obtained, and the rotation axis R and the rotation angle φ are obtained, see FIGS. 6 and 7;

wherein the rotation angle φ is:

$$\varphi = \arccos\left(\frac{A \cdot B}{|A||B|}\right)$$

the rotation axis R is:

$$R = \begin{pmatrix} a_2 b_3 & -a_3 b_2 \\ a_3 b_1 & -a_1 b_3 \\ a_1 b_2 & -a_2 b_1 \end{pmatrix}$$

the unit vector $R_0$ corresponding to the rotation axis R is:

$$R_0 = \begin{pmatrix} r_1 \\ r_2 \\ r_3 \end{pmatrix}$$

and a rotation matrix T from rotation from the vector A to the vector B is obtained by the Rodrigues' rotation formula:

$$T = \begin{bmatrix} \cos\varphi + r_1^2(1-\cos\varphi) & r_1 r_2(1-\cos\varphi) - r_3\sin\varphi & r_2\sin\varphi + r_1 r_3(1-\cos\varphi) \\ r_3\sin\varphi + r_1 r_2(1-\cos\varphi) & \cos\varphi + r_2^2(1-\cos\varphi) & -r_1\sin\varphi + r_2 r_3(1-\cos\varphi) \\ -r_2\sin\varphi + r_1 r_3(1-\cos\varphi) & r_1\sin\varphi + r_2 r_3(1-\cos\varphi) & \cos\varphi + r_3^2(1-\cos\varphi) \end{bmatrix}$$

Further, according to a chosen order of Euler angles, corresponding Euler angles can be obtained, thereby enabling positioning of the axis of the automatic sublance 5;

3) driving the end-effector 2 by the driving device 1 such that the laser distance sensor 3 moves along the axis of the automatic sublance 5 determined by the center point I and the center point II to the plugging detection set height III 10, wherein a position value of the end-effector 2 in the coordinate system O-XYZ when a measured value of the laser distance sensor 3 has a large jump (generally jumps beyond a measuring range of the laser distance sensor 3) is recorded, at the same time, a center point III ($X_{III}$, $Y_{III}$, $Z_{III}$) of the cross section at the height of the end of the automatic sublance 5 can be calculated with reference to an indicated value of the laser distance sensor 3 and a diameter value of the automatic sublance 5 at the height where the scanning occurs; and 4) driving the end-effector 2 by the driving device 1 such that the gripper 4 grasps the probe 6 and a position and orientation of an end surface of the probe 6 is adjusted to be the same as the position and orientation of the end of the automatic sublance 5 calculated in step 3), and the probe 6 is plugged on the automatic sublance 5 at the plugging setting area 7.

A first plugging method: the gripper 4 for grasping the probe 6 performs plugging according to the position and orientation of the end of the automatic sublance 5 and the position and orientation of the axis of the automatic sublance 5 under the drive of the driving device 1 to realize plugging.

The second plugging method: after the gripper 4 for grasping the probe 6 plugs the probe 6 on a short section of the automatic sublance 5 under the drive of the driving device 1, the automatic sublance 5 is pulled back to a plugging position where the axis is parallel to the Z axis of the world coordinate system, and then plugging is performed.

The probe unplugging detection process includes following steps of:

a) providing an unplugging setting area 11 on the periphery of the automatic sublance 5, wherein a top of the unplugging setting area 11 is an unplugging detection set height I 12, an unplugging detection set height II 13 is provided above the unplugging detection set height I 12, and an unplugging detection set height III 14 is provided above the unplugging detection set height II 13, and the probe 6 of the automatic sublance 5 is located in the unplugging setting area 11;

b) driving the end-effector 2 by the drive device 1 such that the laser distance sensor 3 moves and scans the automatic sublance 5 along the +Y direction of the world coordinate system O-XYZ at the unplugging detection set height I 12, wherein during the scanning, a position value of the end-effector 2 in the world coordinate system O-XYZ when a measured value of the laser distance sensor 3 is the minimum is recorded, at the same time, a center point IV ($X_{IV}$, $Y_{IV}$, $Z_{IV}$) of the cross section of the automatic sublance 5 at the plugging detection set height I 12 can be calculated with reference to an indicated value of the laser distance sensor 3 and a diameter value of the automatic sublance 5 at the height where the scanning occurs; driving the end-effector 2 by the driving device 1 such that the laser distance sensor 3 moves and scans the automatic sublance 5 along the +Y direction of the world coordinate system O-XYZ at the unplugging detection set height II 13, wherein during the scanning, a position value of the end-effector 2 in the world coordinate system O-XYZ when a measured value of the laser distance sensor 3 is the minimum is recorded, at the same time, a center point V ($X_V$, $Y_V$, $Z_V$) of the cross section of the automatic sublance 5 at the unplugging detection set height II 13 can be calculated with reference to an indicated value of the laser distance sensor 3 and a diameter value of the probe 6 at the height where the scanning occurs. A vector from ($X_{IV}$, $Y_{IV}$, $Z_{IV}$) to ($X_V$, $Y_V$, $Z_V$) is denoted as a vector D=($X_{IV}-X_V$, $Y_{IV}-Y_V$, $Z_{IV}-Z_V$), and is briefly denoted as the vector D=($d_1$, $d_2$, $d_3$). Then, a vector C=($c_1$, $c_2$, $c_3$) of the vector D can be obtained, and the rotation axis R and the rotation angle $\varphi$ are obtained, see FIGS. 8 and 9;

wherein the rotation angle $\varphi$ is:

$$\varphi = \arccos\left(\frac{C \cdot D}{|C||D|}\right)$$

the rotation axis R is:

$$R = \begin{pmatrix} c_2 d_3 & -c_3 d_2 \\ c_3 d_1 & -c_1 d_3 \\ c_1 d_2 & -c_2 d_1 \end{pmatrix}$$

the unit vector $R_0$ corresponding to the rotation axis R is:

$$R_0 = \begin{pmatrix} r_1 \\ r_2 \\ r_3 \end{pmatrix}$$

and a rotation matrix T from rotation from the vector C to the vector D is obtained by the Rodrigues' rotation formula as:

$$T = \begin{bmatrix} \cos\varphi + r_1^2(1-\cos\varphi) & r_1 r_2(1-\cos\varphi) - r_3\sin\varphi & r_2\sin\varphi + r_1 r_3(1-\cos\varphi) \\ r_3\sin\varphi + r_1 r_2(1-\cos\varphi) & \cos\varphi + r_2^2(1-\cos\varphi) & -r_1\sin\varphi + r_2 r_3(1-\cos\varphi) \\ -r_2\sin\varphi + r_1 r_3(1-\cos\varphi) & r_1\sin\varphi + r_2 r_3(1-\cos\varphi) & \cos\varphi + r_3^2(1-\cos\varphi) \end{bmatrix}$$

Further, according to a chosen order of Euler angles, corresponding Euler angles can be obtained, thereby enabling positioning of the axis of the probe 6;

c) driving the end-effector 2 by the driving device 1 such that the laser distance sensor 3 moves along the axis of the probe 6 determined by the step b) to the unplugging detection set height III 14, wherein a position value of the end-effector 2 in the coordinate system O-XYZ when a measured value of the laser distance sensor 3 has a jump is recorded, and a height value $Z_{V_I}$ of an end surface of the probe 6 on the automatic sublance 5 can be obtained; and d) according to the height value $Z_{V_I}$ of the end surface of the probe 6 obtained from the step c), driving the end-effector 2 by the driving device 1 such that the gripper 4 is adjusted by a suitable height to adjust the position and orientation of the gripper 4 to be the same as the position and orientation of the probe 6 calculated in the step b) and step c), and then grasping the probe 6 by the gripper 4 to unplug the probe 6 from the automatic sublance 5 at the unplugging setting area 11.

The first unplugging method: the gripper 4 for grasping the probe 6 performs unplugging according to the position and orientation of the axis of the probe 6 under the drive of the driving device 1 to realize unplugging.

The second unplugging method: the gripper 4 for grasping the probe 6 pulls the probe 6 back to an unplugging position where the axis is parallel to a Z axis of the world coordinate system, and then performs the unplugging.

The plugging setting area 7 may cover a change range of the position and orientation of the automatic sublance 5, and the steps 2) and 3) need to be performed by the end-effector 2 in an area outside of the plugging setting area 7 or along an envelope of the plugging setting area 7. In a preferred implementation, the plugging setting area 7 is provided as a cuboid with three sides being parallel to three coordinate axes of the world coordinate system O-XYZ.

The plugging set height within the plugging setting area 7 should have following requirements:

1) the plugging detection set height I 8 and the plugging detection set height II 9 should be located in an area where a diameter of the cross section of the automatic thermometer 5 is larger, and they do not coincide;

2) the position of the plugging detection set height III 10 is lower than the position of the end of the automatic sublance 5; and 3) the plugging detection set height I 8, the plugging detection set height II 9, and the plugging detection set height II 10 may be equally spaced from high to low in the Z direction.

The unplugging setting area 11 may cover a change range of the position and orientation of the automatic sublance 5 plugged with the probe 6, and the steps b) and c) need to be performed by the end-effector 2 in an area outside of the unplugging setting area 11 or along an envelope of the unplugging setting area 11. In a preferred implementation, the unplugging setting area 11 is provided as a cuboid with three sides being parallel to three coordinate axes of the world coordinate system O-XYZ.

The plugging set height within the unplugging setting area 11 should have following requirements:

1) the unplugging detection set height I 12 and the unplugging detection set height II 13 should be located near an area to be grasped by the gripper 4 of the probe 6 plugged on the automatic sublance 5, and they do not coincide;

2) the position of the unplugging detection set height III 14 is higher than the height of the upper end surface of the probe 6 plugged on the automatic sublance 5; and 3) the unplugging detection set height I 12 may be lower than the unplugging detection set height II 13.

Those of ordinary skill in the art should recognize that the above embodiments are only used to explain the invention, but not to limit the invention, and the variations and modifications to the above embodiments will fall within the scope of the claims of the present invention as long as they are within the scope of the essence of the present invention.

What is claimed is:

1. A method for plugging/unplugging a probe of a metallurgical automatic sublance, comprising: mounting a laser distance sensor on an end-effector of a drive device, driving the laser distance sensor by the drive device to scan the automatic sublance according to setting areas; calculating and obtaining a position and orientation information of the automatic sublance; and according to the position and orientation information of the automatic sublance, implementing a process of plugging/unplugging the probe on/from the automatic sublance by a gripper on the end-effector, and further implementing a probe plugging detection process and a probe unplugging detection process, wherein the probe plugging detection process comprises following steps of:

1) providing a plugging setting area on a periphery of the automatic sublance, wherein a bottom of the plugging setting area is a plugging detection set height III, a top of the plugging setting area is a plugging detection set height II, and a plugging detection set height I is provided above the plugging detection set height II, and an end of the automatic sublance is located within the plugging setting area;

2) driving, by the drive device, the end-effector such that the laser distance sensor moves and scans the automatic sublance along a+Y direction of a world coordinate system O-XYZ at the plugging detection set height I and the plugging detection set height II to obtain central points of the automatic sublance at the plugging detection set height I and the plugging detection set height II respectively, and calculating and obtaining a position and orientation information of an axis of the automatic sublance composed of the two central points;

3) driving, by the drive device, the end-effector such that the laser distance sensor moves and scans towards the plugging detection set height III according to the position and orientation information of the axis of the automatic sublance obtained in the step 2), so as to obtain a position and orientation information of a center point at an end of the axis of the automatic sublance; and 4) according to the position and orientation information of the center point at the end of the axis of the automatic sublance, driving, by the drive device, the end-effector such that the gripper grasps the probe and plugs the probe to the end of the automatic sublance within the plugging setting area.

2. The method for plugging/unplugging the probe of the metallurgical automatic sublance according to claim 1, wherein in the step 4), the gripper grasping the probe performs plugging according to the position and orientation of the end of the automatic sublance and the position and orientation of the axis of the automatic sublance under the drive of the drive device to realize plugging of the probe.

3. The method for plugging/unplugging the probe of the metallurgical automatic sublance according to claim 1, wherein in the step 4), after the gripper for grasping the probe plugs the probe on a section of the end of the automatic sublance under the drive of the drive device, the automatic sublance is pulled back to a plugging position where the axis is parallel to a Z axis of the world coordinate system O-XYZ, and then the plugging of the probe is performed.

4. The method for plugging/unplugging the probe of the metallurgical automatic sublance according to claim 1, wherein the drive device is a 6-DOF industrial robot.

5. The method for plugging/unplugging the probe of the metallurgical automatic sublance according to claim 1, wherein an opening degree of the gripper is larger than an outer diameter of the probe on the automatic sublance.

6. The method for plugging/unplugging the probe of the metallurgical automatic sublance according to claim 1, wherein the probe unplugging detection process comprises following steps of:
  a) providing an unplugging setting area on the periphery of the automatic sublance, wherein a top of the unplugging setting area is an unplugging detection set height I, an unplugging detection set height II is provided above the unplugging detection set height I, and an unplugging detection set height III is provided above the unplugging detection set height II, and the probe of the automatic sublance is located within the unplugging setting area;
  b) driving, by the drive device, the end-effector such that the laser distance sensor moves and scans the automatic sublance along the +Y direction of the world coordinate system O-XYZ at the unplugging detection set height I and the unplugging detection set height II to obtain central points of the automatic sublance at the unplugging detection set height I and the unplugging detection set height II respectively, and calculating and obtaining a position and orientation information of an axis of the probe composed of the two central points;
  c) driving, by the drive device, the end-effector such that the laser distance sensor moves and scans towards the unplugging detection set height III according to the position and orientation information of the axis of the probe obtained in the step 2), so as to obtain a position information of an upper end surface of the probe; and
  d) according to the position and orientation information of the axis of the probe and the position information of the upper end surface, driving, by the drive device, the end-effector such that the gripper grasps the probe and unplugs the probe from the automatic sublance within the plugging setting area.

7. The method for plugging/unplugging the probe of the metallurgical automatic sublance according to claim 6, wherein the plugging setting area and the unplugging setting area are each arranged as a cuboid with three sides of each of the plugging setting area and the unplugging setting area being parallel to three coordinate axes of the world coordinate system O-XYZ.

8. The method for plugging/unplugging the probe of the metallurgical automatic sublance according to claim 6, wherein a position of the plugging detection set height III is lower than a position of the end of the automatic sublance.

9. The method for plugging/unplugging the probe of the metallurgical automatic sublance according to claim 6, wherein a position of the unplugging detection set height III is higher than a position of an upper end surface of the probe on the automatic sublance.

10. The method for plugging/unplugging the probe of the metallurgical automatic sublance according to claim 6, wherein in the step d), the gripper grasping the probe performs unplugging according to the position and orientation of the axis of the probe under the drive of the drive device to realize the unplugging of the probe.

11. The method for plugging/unplugging the probe of the metallurgical automatic sublance according to claim 6, wherein in the step d) the gripper grasping the probe pulls the probe back to an unplugging position where the axis is parallel to a Z axis of the world coordinate system O-XYZ under the drive of the drive device and then performs the unplugging of the probe.

12. The method for plugging/unplugging the probe of the metallurgical automatic sublance according to claim 6, wherein the plugging setting area and the unplugging setting area are each arranged as a cuboid with three sides of each of the plugging setting area and the unplugging setting area being parallel to three coordinate axes of the world coordinate system O-XYZ.

13. The method for plugging/unplugging the probe of the metallurgical automatic sublance according to claim 6, wherein the drive device is a 6-DOF industrial robot.

14. The method for plugging/unplugging the probe of the metallurgical automatic sublance according to claim 6, wherein an opening degree of the gripper is larger than an outer diameter of the probe on the automatic sublance.

\* \* \* \* \*